Jan. 7, 1958     A. E. DEELEY-JONES     2,818,932
EXHAUST MEANS
Filed Jan. 4, 1955     2 Sheets-Sheet 1
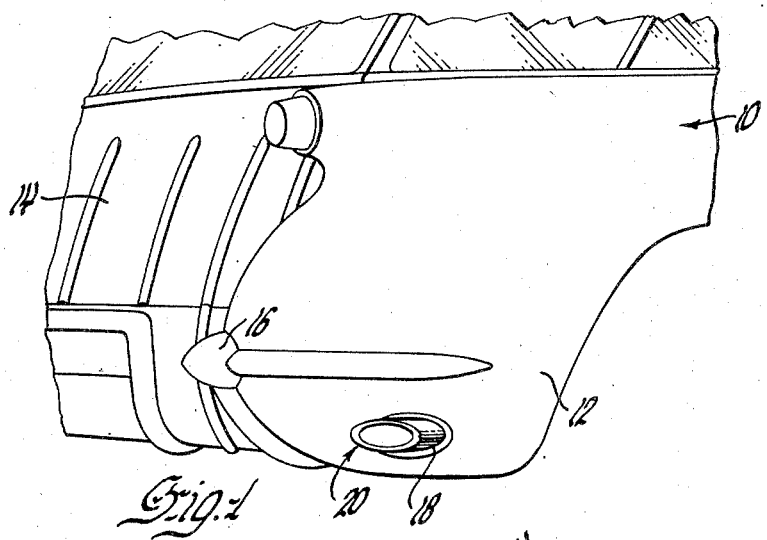
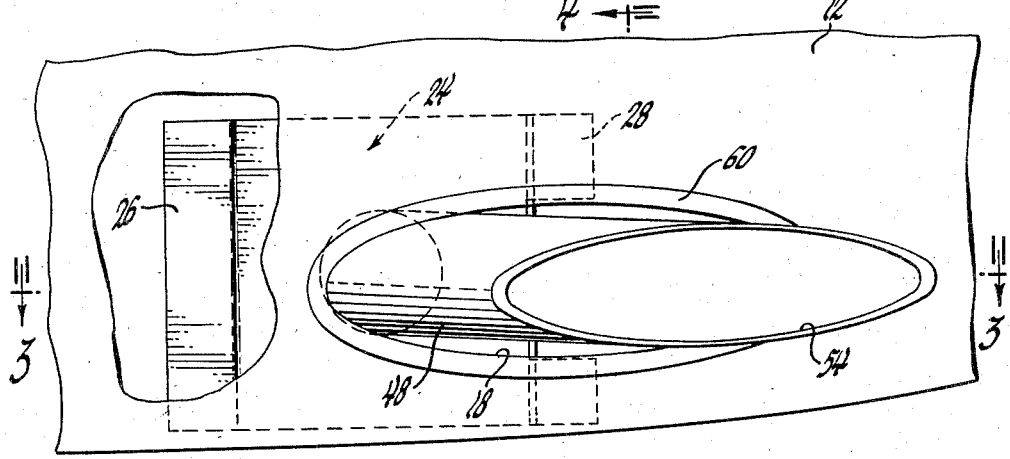
Inventor
Arnold E. Deeley-Jones
By L. D. Burch
Attorney

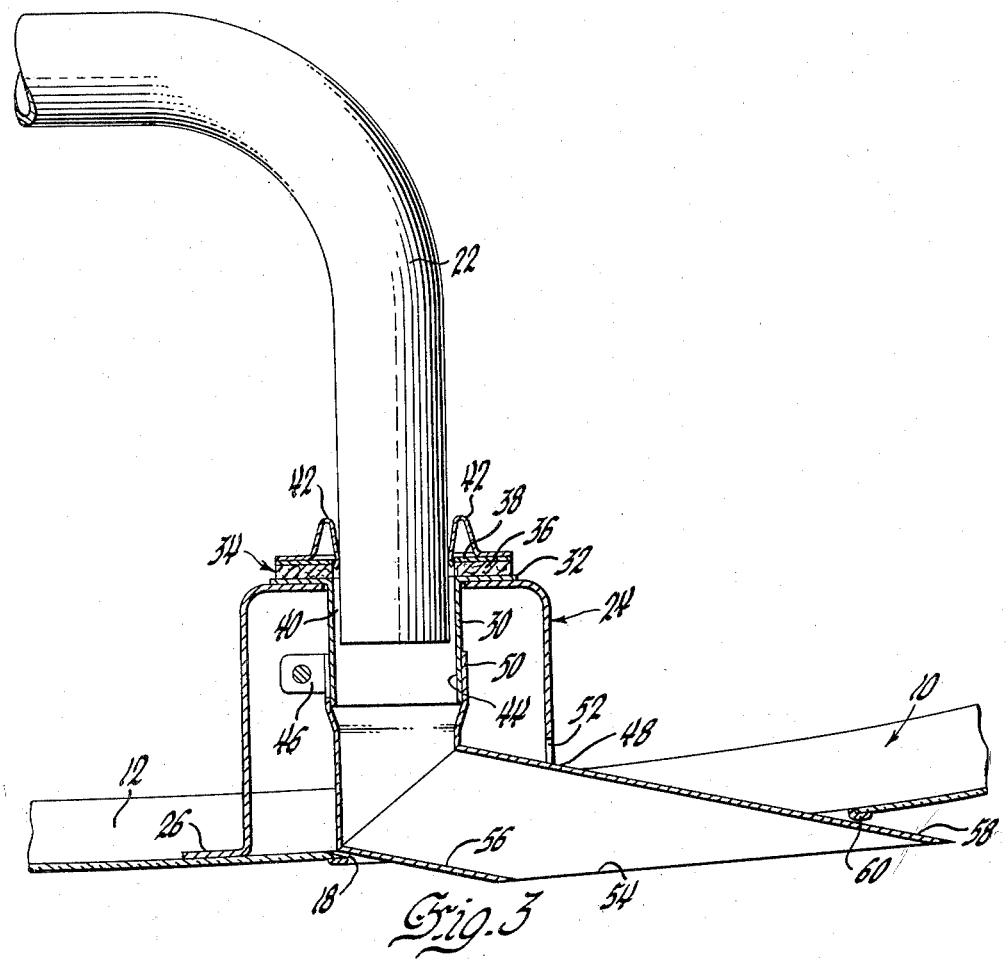
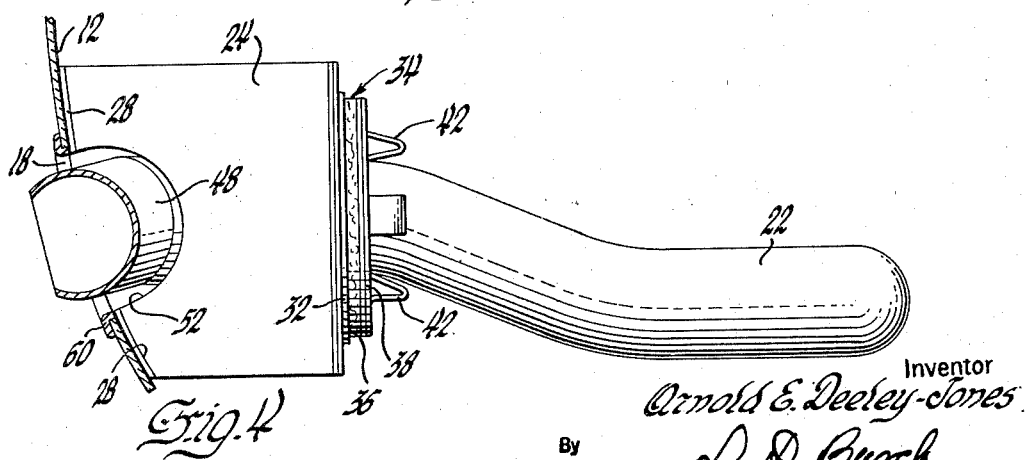

United States Patent Office 2,818,932
Patented Jan. 7, 1958

2,818,932

EXHAUST MEANS

Arnold E. Deeley-Jones, Detroit, Mich., assignor to General Motors Corporation, Detroit, Mich., a corporation of Delaware Application January 4, 1955, Serial No. 479,806

3 Claims. (Cl. 180—64)

This invention relates to engine exhaust means generally and more particularly to exhaust means as adapted for use with automotive and other vehicles.

In automotive vehicles the exhaust conduits for carrying away engine exhaust gases are generally extended under the vehicle body to exhaust the gases at the rear of the vehicle. With those vehicle bodies which are disposed closer to the ground it is more difficult to have the exhaust conduit disposed under the vehicle body and particularly difficult to have the after end of the exhaust conduit disposed under the rear vehicle bumper. It has been proposed to have the end of the exhaust conduit extended through the rear body panel or bumper member. However, such disposition has many disadvantages, one of which is the possibility of damage to the exhaust conduit.

It is now proposed to provide means for allowing the escape of exhaust gases from automotive engines through the side of the rear portion of the vehicle body. It is proposed to provide means for directing exhausted gases rearwardly of the vehicle through a side wall thereof. It is further proposed to provide means permitting the exhaust of hot gases through a vehicle side wall without damage or discoloration to such side wall as by the dissipation of heat thereto. It is proposed to provide a structure which is inexpensive to manufacture and install, is adaptable for the purpose proposed and is pleasing in appearance.

In the drawings:

Figure 1 is a perspective view of the rear quarter section of a vehicle having the proposed exhaust means mounted therein.

Figure 2 is a side view of a part of the vehicle side wall showing the exhaust means extended therethrough.

Figure 3 is a sectional view taken in the plane of line 3—3 of Figure 2 looking in the direction of the arrows thereon and showing the proposed exhaust means as extended through the side wall of a vehicle body.

Figure 4 is a sectional view taken in the plane of line 4—4 of Figure 2 through the proposed exhaust means looking in the direction of the arrows thereon.

In the drawings there is shown a rear quarter portion of a vehicle body 10 including the rear fender section 12 and the after end 14 of the vehicle. The vehicle bumper 16 at the rear end of the body is shown as a quarter-type bumper through the conventional bumper structure extending across the end of the vehicle might also be used. Extending through an opening 18 provided within the rear fender section 12 is the exhaust means 20.

The exhaust means 20 include an exhaust conduit 22 adapted to be secured to the exhaust manifold of the vehicle engine (not shown) in the conventional manner and extended rearwardly of the vehicle body 10. The conduit 22 is formed near its after end to extend towards the fender side wall 12 of the vehicle as is shown in Figure 3. It is preferable that the curvature formed be gradual to minimize back pressure within the conduit.

A bracket 24 is secured to the side panel of the vehicle which, in this instance, is the rear fender panel 12. The bracket 24 is a U-shaped strap having its ends 26 and 28 bent out and secured to the side wall 12 and over the opening 18 formed therethrough. A sleeve member 30 is extended through the end of the bracket 24 and is secured thereto by a flange 32. Means 34 for receiving and centering the exhaust conduit within the sleeve member are secured to the flange 32. The centering means 34 include an annular ring of resilient material 36 bonded or otherwise secured to the flange 32 of the sleeve member and having an annular plate 38 bonded or otherwise secured to the outer surface thereof. An annular passage 40 is provided between the sleeve and exhaust conduit as centered therein. Spring fingers 42 are secured to the plate 38 and are adapted to engage and center the exhaust conduit 22 as received within the passage 44 of the sleeve member 30.

Secured to the end of the sleeve member 30, as by a hose-type connection 46 or other suitable fastening means, is a tail pipe extension member 48. The extension member is enlarged near one end as at 50 in order to be telescoped over the end of the sleeve member 30. The other end of the extension member 48 is formed to extend rearwardly of the vehicle body 10 and through the opening 18 in the side wall 12 thereof. The opening 18 is elliptical in shape to accommodate the end of the extension member 48 as it extends obliquely therethrough. The bracket 24 is cut away as shown in Figure 4 by numeral 52 for a like reason. The outer portion of the extension member 48 is cut off parallel to the side wall 12 of the vehicle thereby forming an elliptical opening 54 and having the end of the extension member 48 lying substantially flush with the side wall 12 of the vehicle body. The remaining outer portion of the extension member as indicated by numeral 56 directs the exhaust gases rearwardly of the vehicle and the end of the inner portion forms a lip 58 extended past the edge of the opening 18. An ornamental ring 60 is secured to the vehicle body around the edge of the opening 18 and in spaced relation to the extension member 48 passing therethrough.

The exhaust gases from the vehicle engine which are conveyed through the exhaust conduit 22 are received within the sleeve member 30 and are directed into the tail pipe extension 48. The gases flow through the extension member 48 and out the elliptical opening 54 formed in the end thereof and rearwardly of the vehicle.

The exhaust conduit 22 is engaged at its outer end only by the spring fingers 42 adapted to center the conduit within the sleeve member 30. The resilient material 36 isolates the exhaust conduit 22 to prevent the conduction of heat through the centering means 34 to the bracket member 24. Since the exhaust conduit 22 is supported by the bracket 24 at a distance from the side wall 12, and the bracket is open on two sides, any heat received by the bracket is readily dissipated away before reaching the side wall. The flow of exhaust gases through the sleeve member 30 will also draw cool air through the annular space 40 between the conduit 22 and sleeve member 30 thereby helping to cool the sleeve member and lower the temperature of the exhaust gases. The exhaust gases will pass a certain amount of heat to the extension member 48 before being exhausted through the opening 54 provided at the end thereof. However, the extension member 48 is spaced apart from both the bracket 28 and the side walls 12 of the vehicle and therefore will not conduct the heat to the vehicle side wall.

The engine exhaust means 20, which includes the tail pipe extension 48 as installed, is within the protection of the bumper member 16 and lies sufficiently flush with the vehicle body side wall 12 so as not to present an obstruction. The exhaust gases are passed through the opening 18 in the vehicle side wall 12 by means disposed in fixed spaced relation to the edges of such opening. The extension means 48 not only direct the exhaust gases rearwardly and outwardly away from the vehicle body 10 but also provide a protective lip 58 shielding the body from such gases. A preferable location for having the proposed exhaust means extend through the vehicle side wall is within the outermost, rearmost, and lowermost portion of the side wall. Such disposition further assures that the gases as directed outwardly will be conveyed away from the side walls.

I claim:

1. Exhaust means for use with automotive vehicles and which include, an exhaust conduit connected to an engine and extended rearwardly of said vehicle, said conduit being curved near the after end thereof to extend towards a side panel of said vehicle, an opening formed through said side panel, a bracket secured to said side panel over said opening, a sleeve member secured to said bracket for receiving the end of said exhaust conduit therein, means secured to said bracket for centering said exhaust conduit is spaced relation within said sleeve, and an extension member secured to said sleeve and formed to extend obliquely towards the rear of said vehicle and through said opening, said extension member being disposed in spaced relation to said side panel and being adapted to direct exhaust gases therethrough and rearwardly of said vehicle.

2. Exhaust means including a U-shaped bracket member adapted to be secured to a side panel having an opening formed therethrough, a sleeve member secured to said bracket member, means secured to said sleeve member receiving and centering the end of an exhaust conduit in spaced relation within said sleeve member, and an L-shaped tail pipe extension member secured to said sleeve member and extended obliquely towards the rear of said vehicle and in spaced relation through said opening, said extension being extended beyond said side panel and being cut off substantially parallel thereto to provide an elliptical exhaust opening.

3. Exhaust means for use with an automotive vehicle which includes an engine having an exhaust conduit connected thereto and extended rearwardly of said vehicle and an opening formed through a rear side panel of said vehicle, said means comprising a U-shaped strap member secured to said side panel over said opening, a sleeve member secured to said strap member and receiving the end of said exhaust conduit therein, means secured to one end of said sleeve member centering said conduit in spaced relation thereto, an extension member secured to the other end of said sleeve member and formed to extend obliquely towards the rear of said vehicle and through said opening, said opening being elliptical to receive said extension member therethrough in spaced relation to the edge of said side panel forming said opening, and the end of said extension member being formed to provide an elliptical opening substantially in the plane of said side panel for exhausting engine gases outwardly and rearwardly of said vehicle.

References Cited in the file of this patent

UNITED STATES PATENTS

| | | |
|---|---|---|
| 897,586 | Chatfield | Sept. 1, 1908 |
| 2,458,670 | Young | Jan. 11, 1949 |
| 2,489,481 | Chester | Nov. 29, 1949 |
| 2,589,780 | Costello et al. | Mar. 18, 1952 |
| 2,613,099 | Arbib | Oct. 7, 1952 |

FOREIGN PATENTS

| | | |
|---|---|---|
| 743,439 | Germany | Dec. 27, 1943 |